Patented June 13, 1933

1,913,515

UNITED STATES PATENT OFFICE

CASPAR SCHMITT, OF HEIDELBERG, GERMANY

METHOD OF EXTRACTING VITAMIN SUBSTANCES FROM COTTONSEED

No Drawing. Application filed August 20, 1928, Serial No. 300,960, and in Germany May 18, 1928.

Cotton seed is very rich in vitamin substances. Their centre is the yellow pulp of the fruit, in which they remain even after the oil has been eliminated from the seed. According to the invention the water-soluble vitamins of cotton seed in combination with organic nutritive salts and proteins are rendered useful for purposes of nourishment and the promotion of health in a very simple way. After peeling by grinding and removal of the oil by pressing, the cotton seed is ground as fine as possible, well distributed by stirring in water or liquids containing water, thus washed and then filtered off. The original cotton seed contains vitamins A, B, C and E; the aqueous fluid extract contains the water-soluble vitamins B and C, besides proteins and other important nutriments.

If water is used for extracting purposes, a liquid is obtained which has the appearance of a light egg yellow solution and can be carefully thickened and dried. The extract can also be despatched and kept in this state.

The cotton seed vitamins and other nutritive substances are intended according to the invention to be used for example to increase the nutritive value of milk and the foods made therefrom, such as butter, cheese, margarine, edible ice etc. 50 gs. of very fine cotton seed meal are introduced into 1 litre of milk, well stirred and filtered through a watt filter. If fresh milk is added to the milk extract obtained, the same acquires after a few hours a fine taste of butter with a high content of vitamins, which is also maintained in the foods prepared from this milk. As the extracting of the cotton seed meal is somewhat hindered by the fat content of the milk, fresh skim milk can be used therefor and the cream added again if desired after the extraction.

If 500–1000 gs. very fine cotton seed meal are extracted in 5–10 litres wine, beer or other liquors, also non-alcoholic liquors and the filtrate added to about 100 litres of wine, beer and the like, the valuable vitamin and nutritive substances in the cotton seed are by this means incorporated with the liquors.

It is also possible to prepare a wine-like or invigorating liquor directly from the cotton seed meal. 50 gs. are extracted in 1 litre water and mixed at about 20° with refined yeast. The sugar contained in the former of melitriose in the fruit pulp of the cotton seed enables this use.

The extractive substances of cotton seed can also be added in the preparation of baked goods, such as bread, zwieback, biscuits etc. The baked goods thus acquire an attractive nut-like taste and an appearance similar to that obtained upon addition of fresh egg yolk.

Finally the finely ground fruit pulp of the cotton seed from which the oil has been removed, can also be employed directly, for example as addition in the preparation of yeast. The vital substances which in such a case pass into solution and are taken up by the yeast, are of advantage in the baking process. Moreover the light yellow pulp of the fruit of the cotton seed from which the oil has been removed or its extractives can be worked up as addition to cocoa, chocolate and also in combination with a little sugar, dry cream, dried milk etc. to form sweets, tabloids, etc. Such tabloids are especially valuable to those engaged in sports or other occupations involving considerable energy. Owing to their vitamin content they regulate the blood circulation and the activity of the nerves without having any subsequent relaxing effect.

What I claim is:—

1. A method of preparing vitamin-containing substances from cotton seed for incorporation with foodstuffs of all kinds, consisting in peeling the fruit pulp of cotton seed, removing the oil therefrom, grinding the residue as finely as possible, and extracting the residue with water during agitation and finally filtering the product.

2. A method of preparing vitamin-containing substances from cotton seed for incorporation with foodstuffs of all kinds, consisting in peeling the fruit pulp of cotton seed, removing the oil therefrom, grinding the residue as finely as possible, and extracting the residue with a liquid solvent containing water during agitation and finally filtering the product.

3. A method of preparing vitamin-containing substances from cotton seed for incorporation with foodstuffs of all kinds, consisting in peeling the fruit pulp of cottonseed, removing the oil therefrom, grinding the residue as finely as possible, and extracting the residue with water during agitation and filtering the product, thus obtaining a liquid having the appearance of a light egg yolk solution and finally thickening and drying the liquid.

In testimony whereof I have signed my name to this specification.

CASPAR SCHMITT.